Sept. 8, 1953
C. B. GAMBLE
2,651,328
DIAPHRAGM FOR PRESSURE RESPONSIVE APPARATUS
AND THE LIKE AND PRESSURE RESPONSIVE
DEVICE EMBODYING THE SAME
Filed Feb. 10, 1950
3 Sheets-Sheet 1
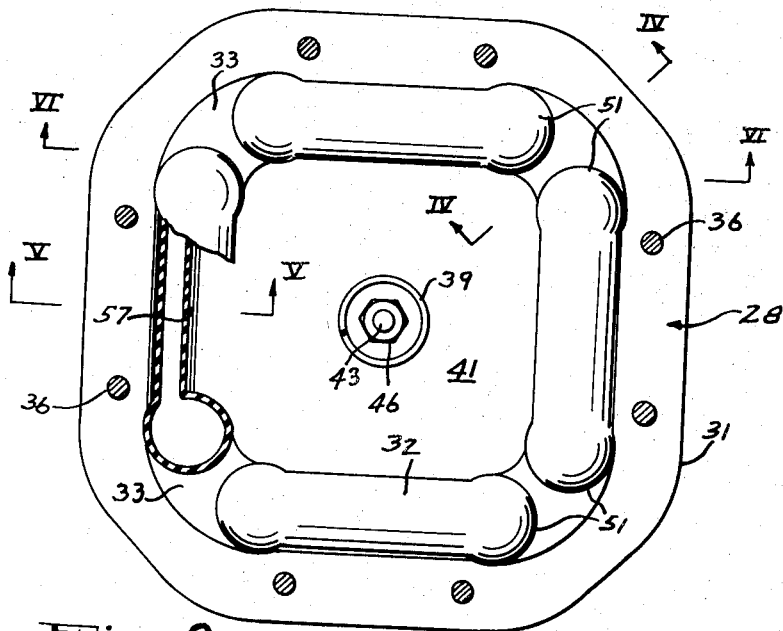
Fig.2
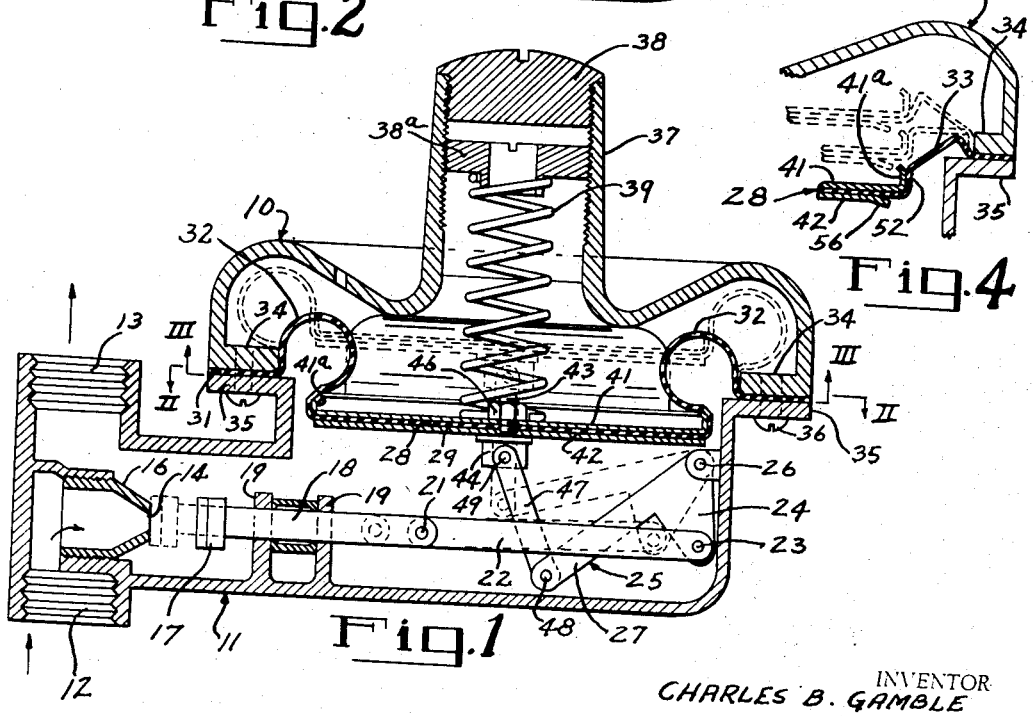
Fig.4
Fig.1
INVENTOR
CHARLES B. GAMBLE
BY  *Jennings & Carter*
ATTORNEYS Sept. 8, 1953 C. B. GAMBLE 2,651,328
DIAPHRAGM FOR PRESSURE RESPONSIVE APPARATUS
AND THE LIKE AND PRESSURE RESPONSIVE
DEVICE EMBODYING THE SAME
Filed Feb. 10, 1950 3 Sheets-Sheet 2

INVENTOR
CHARLES B. GAMBLE
BY Jennings + Carter
ATTORNEYS

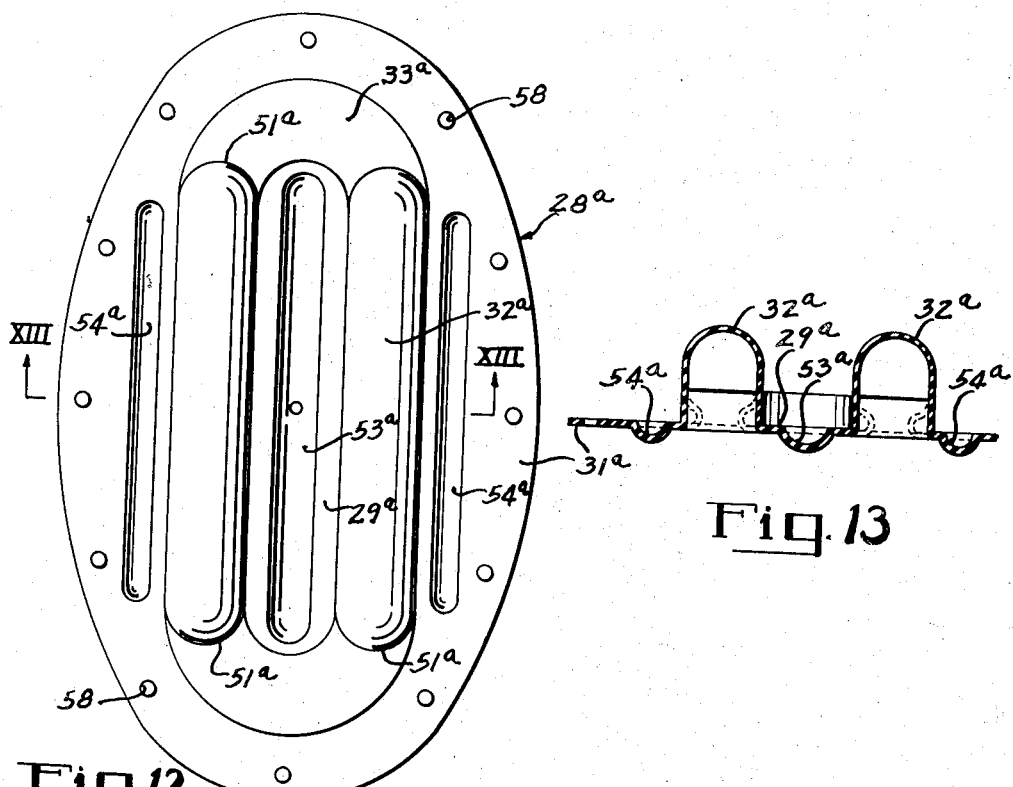
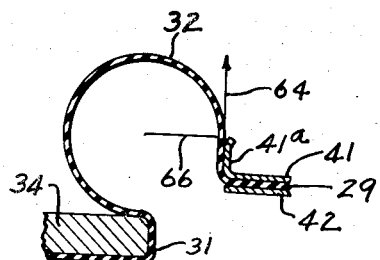
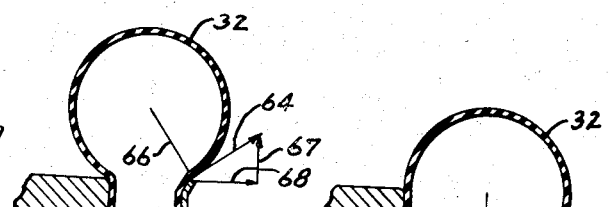
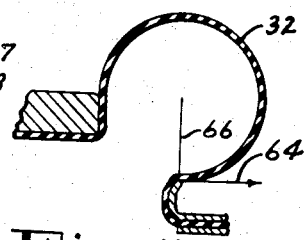
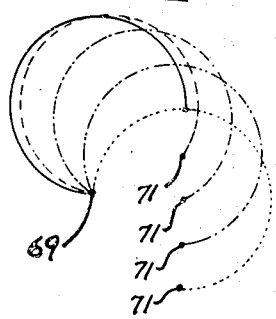

Patented Sept. 8, 1953

2,651,328

UNITED STATES PATENT OFFICE 2,651,328

DIAPHRAGM FOR PRESSURE RESPONSIVE APPARATUS AND THE LIKE AND PRESSURE RESPONSIVE DEVICE EMBODYING THE SAME

Charles B. Gamble, Birmingham, Ala.

Application February 10, 1950, Serial No. 143,482

15 Claims. (Cl. 137—788)

My present invention relates to diaphragms for pressure responsive apparatus and the like, such for instance as pressure regulators, hydraulic scales, fuel injection pumps, and so forth, and to its application to a pressure regulator or the like, to improve the operating characteristics of said regulator.

An object of my invention is to provide a diaphragm of the character designated which comprises essentially a sheet of flexible material having a central portion of substantially fixed area, a peripheral portion disposed to be clamped between suitable parts of the apparatus with which the diaphragm is used, at least one pair of partially cylindrical portions having substantially semi-spherical segments at their ends and having straight side edges secured to the inner and peripheral portions and their end edges secured to other portions connecting the ends of the partially cylindrical portions to adjacent edges of the inner and peripheral portions and to each other, whereby the central or inner portion is free to move bodily in a path normal to the plane occupied by the peripheral portion; whereby depending upon the relative dimensions of the various parts said central portion when moving in relation to said plane of the peripheral portion, may maintain an approximately equal effective area for the diaphragm as a whole through the entire travel thereof, or increase the effective area of the diaphragm as a whole when moving away from the side against which the fluid presses, or similarly, decrease the effective area of the diaphragm as a whole when moving in the opposite direction, thus obtaining for apparatus embodying my improved diaphragm the functional advantages hereinafter more particularly set forth.

My invention contemplates a diaphragm of flexible material in which the edges of the segmental cylindrical portions are straight whereby these portions rock or roll freely and with minimum resistance about the straight edges along the line of juncture of such edges with the central portion of the diaphragm, whereby the components of the forces produced by the pressure of the fluid within the segmental portions normal to the plane of the central portion decrease as the plane of the central portion changes from its maximum position above to its maximum position below the plane of the peripheral portion.

Another object is to provide a diaphragm of the character designated in which the portions of the diaphragm joining the ends of the segmental cylindrical portions to each other and to the central and peripheral portions develop components of forces acting on the central portion normal to the plane thereof, which forces increase as the plane of the central portion changes from its maximum position above to its maximum position below the plane of the peripheral portion, whereby, by properly proportioning the dimensions of the inner, segmental cylindrical and joining portions of the thrust of the fluid below the diaphragm normal to the plane of the central and peripheral portions may be caused to be approximately constant, greater, or less as the relationship of the plane of the central portion to that of the peripheral portion is changed.

Another object is to provide a diaphragm of flexible material having a plurality of integrally formed, partially cylindrical, elongated sections upstanding from the general plane of the central and peripheral portions on the side of said plane removed from the pressure side of the diaphragm, said partially cylindrical portions being joined fluid tight along the length of the edges thereof adjacent the peripheral portion, leaving the central portion free to move normal to the plane of the peripheral portion, whereby as said central portion moves the partially cylindrical portions roll or rock about the points of juncture with the peripheral and central portions, thus causing the effect of pressure on the cylindrical portions to be additive to the effect of pressure on the central portion when the central portion is moving toward the non-pressure side of the diaphragm, and subtractive when the same is moving oppositely.

Another object is to provide a diaphragm of the character designated in which the ends of the partially cylindrical portions are partially spherical in configuration, and in which there are provided portions upstanding on the same side of the diaphragm as the partially cylindrical portions and joining the spherical ends fluid tight to the remainder of the diaphragm thus providing flexible connecting portions which are effective to complete the diaphragm and provide for freedom of rolling or rocking action of the partially cylindrical portions as above mentioned.

A further object is to provide a pressure responsive device embodying my improved diaphragm and in which the diaphragm is operatively connected to the valve of the pressure responsive device, thus providing a device in which the outlet pressure is closely controlled over a wide range of varying conditions of operations such as changes in rate of flow of fluid through the regulator and changes of inlet pressures; in which the movement of the valve from opened to closed position may be increased over that of prior apparatus, or similarly in which the closing and opening forces exerted by the diaphragm on the valve may be increased through suitable compounding linkage operatively interposed between the diaphragm and valve, making possible the use of a diaphragm of lesser area for equal valve closing power; and in which the diaphragm shall automatically compensate for changes under usual operating conditions of varying fluid delivery in the force exerted by the usual counterbalancing means associated with the diaphragm, thereby increasing the uniformity of pressure control of the fluid being regulated.

Apparatus illustrating the features of my invention is shown in the accompanying drawings forming a part of this application in which:

Fig. 1 is a vertical sectional view taken through a pressure regulator embodying my improved diaphragm and showing the valve of the regulator opened in full lines and closed in dotted lines;

Fig. 2 is a view taken generally along line II—II of Fig. 1 and showing the diaphragm in lowered position;

Fig. 4 is a detail sectional view taken along line IV—IV of Fig. 2;

Figure 3:
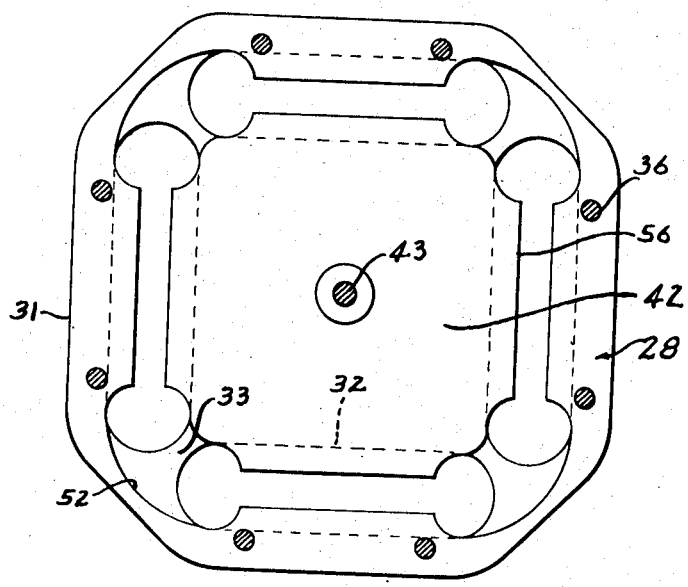
Fig. 3 is a view taken generally along line III—III of Fig. 1 and showing the central portion of the diaphragm in intermediate position.
Figure 5:
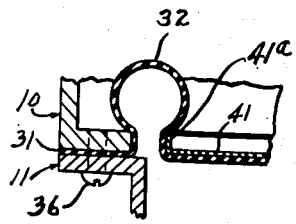
Fig. 5 is a detail sectional view taken along line V—V of Fig. 2 and with the central portion of the diaphragm raised to intermediate position.
Figure 6:
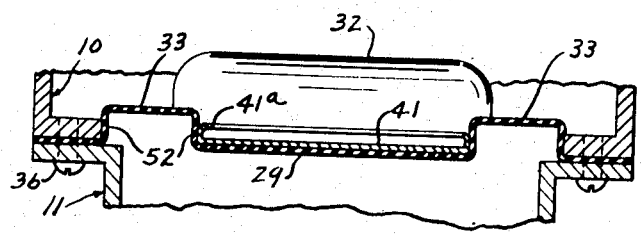
Fig. 6 is a sectional view taken generally along line VI—VI of Fig. 2.

Figs. 8 to 10, inclusive, are wholly diagrammatic views showing one of the partially cylindrical portions in fully raised, intermediate and fully lowered positions, respectively, thereby to illustrate the forces acting on the same;

Fig. 11 is a wholly diagrammatic view illustrating the rocking or rolling motion of one of the partially cylindrical portions about the fixed terminal edges or sides thereof;

Fig. 12 is a plan view of a modified form of diaphragm embodying the features of my invention; and, Fig. 13 is a detail sectional view taken generally along line XIII—XIII of Fig. 12.

Referring now to the drawings for a better understanding of my invention I show in Figs. 1 to 6 a pressure regulator with which my improved type of diaphragm is associated. As before stated, my improved diaphragm has utility in association with various forms of pressure responsive mechanisms, and a disclosure of the same in association with and forming a part of a fluid pressure regulator is for the purpose of description and illustration only. As used in this specification and appended claims the terms "above" and "below" assume that the underside of the plane of the central portion of the diaphragm is the working side against which the fluid presses.

The regulator may embody upper and lower housing sections 10 and 11, respectively. The lower housing section 11 may embody an inlet 12 for the admission to the regulator of the fluid such as a gas under a variable high pressure which it is desired to remove from the housing at a lower, constant pressure through an outlet indicated at 13. In the manner well understood, gas entering the inlet 12 and regulated as to pressure is discharged through a port 14 in a valve housing 16 under control of a movable valve 17. The valve 17 may be carried on the end of a reciprocable stem 18 mounted for movement in suitable guides 19. Pivotally mounted to the outer end of the valve stem 18 as at 21 is one end of a link 22. The opposite end of the link 22 is pivotally connected at 23 to one arm 24 of a crank 25. The crank 25 may be pivoted at 26 to the housing section 11 and may have a longer arm 27 formed integrally with the arm 24.

As will be hereinafter more specifically pointed out and described, my improved diaphragm 28 embodies essentially four portions. The diaphragm embodies a central portion 29, a peripheral portion 31, a plurality of partially cylindrical portions 32, and connecting portions 33. The details of the several parts of the diaphragm, their method of assembly one with the other and their functional relationship will be described in detail later.

The upper section 10 of the regulator housing embodies a peripherally disposed flange 34 disposed to cooperate with a complementary flange 35 on the lower section 11 in clamping between them the peripheral portion 31 of the diaphragm 28. A plurality of screws 36 may be employed to hold the sections assembled and to clamp the peripheral portion 31 of the diaphragm fluid tight therebetween. The housing section 10 may have an upwardly elongated portion 37 closed at its top by means of a threaded plug 38.

Mounted within the upper housing section and having its upper end bearing against a vertically adjustable plug 38a screwed into the threaded elongated section is a compression spring 39. The lower end of the spring 39 bears against a plate 41 mounted on the upper side of the central portion 29 of the diaphragm. Beneath the central portion 29 of the diaphragm is a second plate 42. The plates 41 and 42 are held assembled and pressed tightly together by means of a stud 43 having an enlarged lower section 44. A nut 46 is threaded on the upper end of the stud 43. As shown in Fig. 1 the arm 27 is operatively connected to the center of the central portion of the diaphragm by means of a link 47. The link 47 is pivoted at 48 to the arm 27 and at 49 to the enlarged portion 44 of the stud 43.

Figure 7:
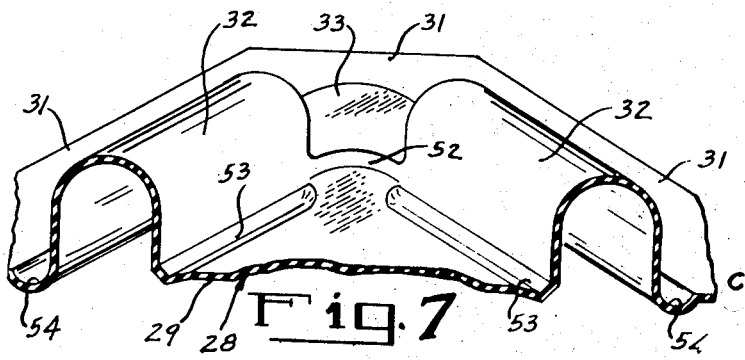
Fig. 7 is a fragmental isometric view through my improved diaphragm with the same removed from the regulator.

As best shown in Figs. 2, 4 and 7, the diaphragm 28 preferably is in the form of a sheet of flexible material impervious to the fluid to contact the same, such for instance as rubber, one of the artificial rubber like materials, suitably treated leather, or the like. The entire diaphragm may conveniently be formed integrally as by molding the same. The partially cylindrical portions 32 preferably are elongated, and in the form of the invention now being described there are four of the portions 32 laid out to define between them the substantially square central portion 29. The ends of the portions 32 preferably are segments of a sphere, more specifically quadri-spherical as indicated at 51. These spherical ends are joined to the portions 33 which as shown rise above the plane of the peripheral portion 31. The connecting portions 33 may be generally plane across their tops and have substantially vertical side walls 52 which are joined to adjacent edges of the central and peripheral portions of the sheet. The shape of the inner section of the segmental spherical ends of the partially cylindrical portions and the joining portions 33 is such as to produce minimum distortion of the diaphragm material during the maximum displacement of the central portion 29 relative to the plane of the peripheral portion. The form of the intersection between the portions just mentioned is approximately that which is made by the intersection of a sphere with a plane when the planes of the central and peripheral portions coincide.

In molding the diaphragm I preferably provide downwardly extending depressions 53 and 54 immediately adjacent the inner and outer sides of the portions 32. The purpose of these depressions is to provide an extra amount of material which when the plates 41 and 42 are clamped to the central portion 29, and when the flanges 34 and 35 are clamped to the peripheral portions 31, flows inwardly, forcing the terminal edges or legs of the portion 32 slightly inwardly. The plate 41 has an upstanding peripheral flange 41a, such flange adding depth to the plate, increasing the strength thereof, and providing an edge about which the portions 32 rock, as will be later explained.

It will be noted also that the edges of the portions 32 are substantially straight. For the reasons hereinafter appearing this is an important feature of my invention. Likewise, the connecting portions 33 preferably are of less height than the portions 32 and each one thereof subtends an arc equal substantially to 360° divided by the number of the portions 32 with which the diaphragm is provided. Thus since the diaphragm 28 has four of the portions 32, the sections 33 each subtends an arc of substantially 90°.

Referring now more particularly to Figs. 12 and 13 I show a modified form of the diaphragm indicated generally by the numeral 28a. The same embodies the partially cylindrical portions 32a, similar in all respects to the portions 32 already described. Likewise, the diaphragm 28a embodies a central portion 29a, the peripheral or flange portion 31a and the connecting or joining portions 33a. The joining portions 33a each subtends an arc of substantially 180° since the diaphragm 28a has two portions 32a. The ends of the partially cylindrical portions 32a are provided with the spherical ends 51a, joined as already stated to the connecting or joining portions 33a. The partially cylindrical portions 32a are substantially parallel to each other, thus making it possible for the diaphragm to be substantially oval as shown in plan. I may provide the central portion 29a and the flange portions 31a with the depressions 53a and 54a, respectively, which function identically with the depressions 53 and 54 already described.

As will be understood, the diaphragm shown in Figs. 12 and 13 is adapted for association with housing members, and the central portion 29a thereof is disposed to be clamped between a pair of stiffening members such as plates or the like, not shown. It will be apparent that when the flange portions and central portions are clamped between their respective members the material in the depressions 53a and 54a flows inwardly, pinching in the legs of the portions 32a, causing them to assume the position shown in dotted lines, Fig. 13. The flange portion 31a may be provided with suitable openings 58 for receiving fastening means passing through the flanges of a housing therefor, not shown.

From the foregoing the method of operation of my improved diaphragm may now be explained and understood. By reference to Figs. 8 to 11, inclusive, it will be seen that when the central portion 29 or 29a of the diaphragm is raised above the plane occupied by the peripheral portions 31 or 31a, a line 64 which is tangent to the radius 66 indicated in Fig. 8 represents the resultant force produced by a gas under pressure and acting upwardly under each of the portions 32 or 32a. Thus, when the central portion of the diaphragm is raised above the plane of the peripheral portion as shown in Fig. 8, the upward resultant of pressure acting on the portions 32 or 32a and transmitted to the central portion 29 or 29a is a maximum as indicated by the line 64. In the position shown in Fig. 8 there is no horizontal component involved in view of the fact that the resultant is tangential to the curvature of the portion 32 at the radius line 66. Considering now Fig. 9, which shows the central portion 29 or 29a in the same plane with the peripheral portions 31 or 31a, it will be seen that the radius line 66 has moved downwardly substantially 45° from its position in Fig. 8. The resultant force indicated by the line 64 involves a vertical component 67 and a horizontal component 68. The component 67 is considerably less than the vertical component indicated by the resultant line 64 in Fig. 8. The effect of pressure on the partially cylindrical portion 32 tending to raise the central portion 29 or 29a of the diaphragm is thus less when the diaphragm is in the position shown in Fig. 9. Considering now Fig. 10, the radius line 66 has moved substantially 90° downwardly from its position shown in Fig. 8, and the resultant 64 is entirely horizontal. In this position, therefore, there is no vertical component of force produced by pressure on the portions 32 or 32a, and hence the overall net area of the diaphragm available to respond to pressure is reduced.

The rocking or rolling motion of the portions 32 or 32a may be more clearly understood by reference to Fig. 11. The numeral 69 represents a point on the terminal edge of one of the portions 32 adjacent the inner edge of the flange 34, while the numeral 71 represents a point on the terminal edge of the portion 32 adjacent the raised peripheral flange 41a of the plate 41. In Fig. 11, the full line position shows the portion 32 with the central portion 29 of the diaphragm in fully raised position. The dash line indicates the same slightly lowered, the dot-dash line still further lowered, and the dash double dot line and the last dotted line indicate the progressive positions of the point 71 as the central portion moves to lower positions. The portions 32 actually roll or rock about the points 69 and 71, thus continually changing the direction of the forces which are tangent thereto adjacent the point 71. Mathematically stated, the vertical components of the forces acting at the point 71 vary as the sine of the angle between the tangent line 64 and an intersecting plane parallel to the plane of the central portions.

Considering now the effect of pressure beneath the diaphragm on the end or connecting portions 33 or 33a, I have found that the effect of pressure beneath the same, as the diaphragm changes its position, is substantially opposite to the effect of pressure acting on the portions 32 or 32a. That is to say, the effect of pressure acting on the portions 33 or 33a makes these portions more effective to lift the diaphragm as the central portion of the diaphragm moves downwardly and conversely less effective as the central portion moves upwardly. Therefore, in designing a diaphragm I am enabled to take an important advantage of this relationship between the effect produced by these two portions. By properly proportioning the size of the portions 32 and 33 or 32a and 33a relative to each other, I can obtain a diaphragm in which the total effective area either increases or decreases as the central portion moves away from upper to lower position. Similarly, by properly proportioning the relative sizes of these portions I can provide a diaphragm in which the net effective area remains substantially constant in all positions of the central portion. In other words, by a proper proportioning of the areas of portions 32 or 32a relative to the portions 33 or 33a, I can cause the portions 33 or 33a to concomitantly make up the effective area loss of the portions 32 or 32a, to be equal therewith, or to exceed the same. To illustrate the point just made, let it be assumed that in a given diaphragm the areas of the portions 32 or 32a account, for instance, for 10% of the total lift of the diaphragm when in the position of Fig. 8, for about 5% thereof when in the position of Fig. 9, and for about 0% thereof when in the position of Fig. 10. If it is desired that the lift of the diaphragm as a whole be constant in all positions of the central portion it is only necessary to make the areas of the portions 33 or 33a such as to counteract the lift of portions 32 or 32a in all positions. This can be done by shortening the length of portions 32 or 32a, hence increasing the area of portions 33 or 33a. Similarly, by increasing the areas of portions 33 or 33a still more relative to the areas of 32 or 32a, the net effective area of the diaphragm will increase as it moves from the position of Fig. 8 to that position shown in Fig. 10. On the other hand, by forming portions 32 or 32a with such areas that they contribute a larger amount of lift than say 10% of the total and reducing the relative area of 33 or 33a, such a diaphragm will have decreasing net area characteristics upon moving downwardly. The importance of this functional characteristic which is possible with my improved apparatus will be appreciated by those skilled in the art and I have thus provided a diaphragm which lends itself to use in various applications where either a constant area, a decreasing area, or an increasing area is desired as the movable portion of the diaphragm changes its position.

When my improved diaphragm is applied to a pressure regulator it will be apparent that the central portion is freely movable within extremely large limits as indicated in Fig. 1. Further, as the spring 39 increases in length the compressive effect thereof decreases. By properly proportioning the diaphragm, the area available to respond to pressure beneath the same may be made to change equally with the decrease in the force exerted by the spring, obtaining the superior regulating characteristics already mentioned. Likewise, due to the increased amount of movement of the central portion of my improved diaphragm, valve 17 may be caused either to travel farther than with conventional diaphragms, or by suitably compounding the linkage the forces exerted by the diaphragm on the valve may be increased.

From the foregoing it will be apparent that I have devised an improved diaphragm for use in pressure responsive devices. I have found that the diaphragm herein disclosed is entirely practical both from the manufacturing and functional standpoints and that the same is effective to increase the utility of pressure responsive devices such as pressure regulators. While I have specifically shown two modifications of the invention in which there are pairs of the partially cylindrical portions having their longitudinal axis substantially parallel, from the disclosure herein given it will be apparent that these portions may be laid out to provide a diaphragm embodying odd numbers of such portions. Insofar as I am presently aware the only limitation on the numbers of the partially cylindrical portions and the end or connecting portions is that the same be arranged symmetrically about the central and flange portions of the diaphragm. Thus, it is possible, and therefore contemplated within the scope and spirit of my invention, that the partially cylindrical portions and the connecting portions may be laid out in triangular, pentagonal, hexagonal, octagonal forms, and so forth.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. In a diaphragm for use in fluid pressure devices embodying a body of flexible material having a movable pressure responsive central portion and a peripherally disposed flange adapted to be clamped between housing members and the like, the combination of a plurality of hollow cylinder-like portions formed in the body and connected fluid tight along the termini of their inner and outer sides to the edges of the central portion and adjacent flanges respectively, the interior of said cylinder-like portions being in communication with the working pressure side of the diaphragm and projecting above the plane of the flanges, and portions projecting above the plane of the flanges connecting the ends of the cylinder-like portions to said central portion and flanges.

2. In a diaphragm for pressure devices, a body of flexible material having central and peripheral portions, a pair of partially cylindrical hollow portions disposed out of the general plane of the peripheral portions, said partially cylindrical portions being disposed with their longitudinal axes substantially parallel and being joined fluid tight along the edges to the central and peripheral portions, and other portions connecting the ends of the partially cylindrical portions joined to the central and peripheral portions and constructed and arranged to permit rolling action of the partially cylindrical portions about the edges thereof upon movement of the central portion in a direction substantially normal to the plane of the peripheral portions.

3. In a diaphragm for pressure devices, a body of flexible sheet material having centrally disposed and flange portions, a pair of substantially parallel elongated hollow partially cylindrical portions disposed between the central and flange portions and having their edges joined fluid tight to adjacent edges of the central and flange portions, said partially cylindrical portions being displaced out of the general plane of the flanges, and sections joined fluid tight to the ends of the partially cylindrical portions and the adjacent flange and disposed out of the plane of the flange in the same direction relative thereto as the partially cylindrical portions.

4. In a diaphragm for use in fluid pressure devices, a relatively thin sheet of flexible material having formed therein a pair of spaced apart elongated and substantially parallel hollow bulbous sections, a central portion connected fluid tight to adjacent side edges of the bulbous sections, peripheral flange portions connected fluid tight to opposed edges of the bulbous sections, each of said bulbous sections being provided with ends which are substantially segments of spheres connected fluid tight thereto, and other hollow sections disposed at the ends of the elongated bulbous sections and connecting the ends thereof fluid tight to the central and flange portions.

5. In a diaphragm for pressure devices, a sheet of flexible material impervious to the fluid to act on the diaphragm, a movable section of the sheet of substantially constant area, sections of the sheet disposed to be held stationary relative to the movable section, at least a pair of upstanding hollow cylinder-like sections located between and joined fluid tight to the first mentioned sections along the londitudinal termini of the walls of the cylinder-like sections, each of said cylinder-like sections having integrally formed partially spherical ends, and other upstanding sections in the sheet disposed between and joined fluid tight to the ends of the cylinder-like sections and said movable and stationary sections, the said other upstanding sections being of less height than the cylinder-like sections and being constructed and arranged to flex along the sides thereof joined to the stationary sections upon movement of the movable section in a plane normal to the plane of the stationary sections.

6. A diaphragm as defined in claim 5 in which the terminal edges of said other upstanding sections joining the movable and stationary sections are curved as viewed in plan.

7. A diaphragm as defined in claim 6 in which the said other sections are substantially circular as viewed in plan and subtend an arc equal substantially to 360° divided by the number of said cylinder-like sections with which the diaphragm is provided.

8. In a diaphragm for use in pressure devices, a sheet of flexible material impervious to the pressure producing medium to act on the diaphragm, said sheet having a generally plane central section and generally plane peripheral sections, said central section being adapted when the diaphragm is in use to move bodily in a direction normal to the plane of the peripheral sections, a plurality of hollow axially parallel partially cylindrical straight sided sections upstanding from the sheet and having the termini of their adjacent and non-adjacent edges joined fluid tight to adjacent outer and inner edges respectively of the central and peripheral sections, the ends of said partially cylindrical sections being substantially quadri-spherical in configuration, and other sections upstanding from the plane of the peripheral sections and connecting the terminal edges of the quadri-spherical sections fluid tight to the adjacent peripheral and central portions.

9. In a pressure responsive diaphragm embodying a sheet of flexible material having a central movable portion and a peripheral flange disposed for clamping between members of a device with which the diaphragm is to be used, the combination of a plurality of parallel pairs of hollow elongated partially cylindrical sections upstanding from the sheet and located between the central portion and flange, the terminal edges of the partially cylindrical sections being joined fluid tight to the adjacent terminal edges of the central portion and flange, end sections joined fluid tight to each of the partially cylindrical sections, and other upstanding sections curved as viewed in plan and with the terminal edges thereof joined fluid tight to adjacent edges of the central section and flange and to the ends of the partially cylindrical sections.

10. A diaphragm as defined in claim 9 in which said other upstanding sections are generally plane at the point of juncture with the ends of the partially cylindrical sections, and have depending generally vertical side walls curved as viewed in plan, and in which the terminal edges of said depending side walls are joined to said central portion and flange.

11. A diaphragm as defined in claim 9 in which there are formed in said sheet depressions extending on either side of the partially cylindrical sections adjacent the point of juncture therewith to the central portions and flange, the material of said depressions being adapted to flow laterally toward the adjacent partially cylindrical sections when the central portions and flanges are clamped between flat members.

12. As an article of manufacture, an integrally formed pressure responsive diaphragm comprising a sheet of flexible material having central and peripheral sections, a plurality of partially cylindrical hollow sections upstanding from the sheet of material and disposed symmetrically about the central portion, said partially cylindrical sections being joined along their edges to the central and peripheral sections, and other sections upstanding from the sheet joining the ends of the partially cylindrical sections to the central and peripheral portions, said partially cylindrical and other sections together extending completely around the central portion.

13. As an article of manufacture, a diaphragm of the character described embodying a sheet of flexible material having a generally plane central portion, upstanding sections joined edgewise to the edges of the central portion, said upstanding sections comprising at least a pair of partially cylindrical hollow sections, other upstanding sections joining together the ends of the partially cylindrical sections, and a peripheral portion of the sheet connected edgewise to the outer edges of the upstanding sections.

14. In a pressure responsive device, embodying housing members having peripherally disposed clamping flanges and a diaphragm of flexible material having peripheral portions clamped between the flanges of the housing members, the combination of a substantially flat plate secured to the central portion of the diaphragm, a pair of elongated partially cylindrical hollow sections on the diaphragm having their longitudinal axes substantially parallel, said cylindrical sections being interposed between the adjacent edges of said central and peripheral portions and having the terminal edges thereof joined fluid tight to the edges of the central and peripheral portions, elevated sections on the diaphragm having depending side walls joined fluid tight to the adjacent edges of the central and peripheral portions, and partially spherical sections joined fluid tight to each end of the partially cylindrical sections and connected fluid tight to the tops of said elevated sections.

15. Apparatus as defined in claim 14 in which inner edges of the clamping flanges of the housing members are disposed closely adjacent the outer side edges of the partially cylindrical portions, whereby as the central portion moves vertically relative to the partially cylindrical portions the latter pivot on said edges along a line adjacent the inner ends of said clamping flanges.

CHARLES B. GAMBLE.

References Cited in the file of this patent

UNITED STATES PATENTS

| Number | Name | Date |
|---|---|---|
| 988,472 | Kinely | Apr. 4, 1911 |
| 2,241,056 | Chilton | May 6, 1941 |
| 2,517,745 | Weatherhead | Aug. 8, 1950 |